United States Patent
Kitagawa et al.

(10) Patent No.: US 12,222,788 B2
(45) Date of Patent: Feb. 11, 2025

(54) INFORMATION PROCESSING SYSTEM AND INFORMATION PROCESSING SYSTEM CONTROL METHOD

(71) Applicant: Mitsubishi Electric Corporation, Tokyo (JP)

(72) Inventors: Ryota Kitagawa, Tokyo (JP); Katsuhisa Ogasawara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 104 days.

(21) Appl. No.: 17/918,583

(22) PCT Filed: Jun. 8, 2020

(86) PCT No.: PCT/JP2020/022517
§ 371 (c)(1),
(2) Date: Oct. 13, 2022

(87) PCT Pub. No.: WO2021/250737
PCT Pub. Date: Dec. 16, 2021

(65) Prior Publication Data
US 2023/0141385 A1 May 11, 2023

(51) Int. Cl.
*G06F 1/3203* (2019.01)
*G06F 1/3225* (2019.01)
(Continued)

(52) U.S. Cl.
CPC .................. *G06F 1/3203* (2013.01)

(58) Field of Classification Search
CPC ........ G06F 1/3203; G06F 1/3225; G06F 9/50; G06F 1/324; G06F 1/3234
See application file for complete search history.

(56) References Cited

U.S. PATENT DOCUMENTS 8,949,663 B2 * 2/2015 Ueda ..................... G06F 9/5083
714/21
2008/0034236 A1 2/2008 Takayama et al.
(Continued)

FOREIGN PATENT DOCUMENTS

JP 2008-40734 A 2/2008
WO 2008/120274 A1 10/2008

OTHER PUBLICATIONS

International Search Report and Written Opinion mailed on Sep. 24, 2020, received for PCT Application PCT/JP2020/022517, filed on Jun. 8, 2020, 8 pages including English Translation.
(Continued)

*Primary Examiner* — Phil K Nguyen
*Assistant Examiner* — Gayathri Sampath
(74) *Attorney, Agent, or Firm* — XSENSUS LLP

(57) ABSTRACT

An information processing system includes an execution block computational strength data area, a roofline model data storage unit, a computational strength data acquisition unit, and a performance power control unit. The execution block computational strength data area holds computational strength data of each execution block constituting an arithmetic application that operates in a computer system including a processor and a main storage apparatus. The roofline model data storage unit holds a roofline model corresponding to an operation frequency and the number of cores of the processor, and an operation frequency of the main storage apparatus. The computational strength data acquisition unit acquires computational strength data of each execution block. The performance power control unit controls an operation frequency and the number of cores of the processor and an operation frequency of the main storage apparatus based on the roofline model and the computational strength data of each execution block.

14 Claims, 17 Drawing Sheets

(51) Int. Cl.
*G06F 1/3228* (2019.01)
*G06F 1/3234* (2019.01)
*G06F 1/324* (2019.01)
*G06F 1/329* (2019.01)
*G06F 1/3296* (2019.01)
*G06F 9/50* (2006.01)

(56) References Cited

U.S. PATENT DOCUMENTS

| | | | |
|---|---|---|---|
| 2014/0089699 A1* | 3/2014 | O'Connor | G09G 5/363 |
| | | | 713/300 |
| 2016/0041775 A1* | 2/2016 | Hanson | G06F 11/3423 |
| | | | 711/169 |
| 2017/0031416 A1* | 2/2017 | Birke | G06F 1/324 |
| 2022/0284274 A1* | 9/2022 | Jang | G06N 3/04 |

OTHER PUBLICATIONS

Williams et al., "Roofline: An Insightful Visual Performance Model for Floating-Point Programs and Multicore Architectures", Communications of the ACM, Apr. 2008, pp. 1-10.

* cited by examiner

F I G. 1
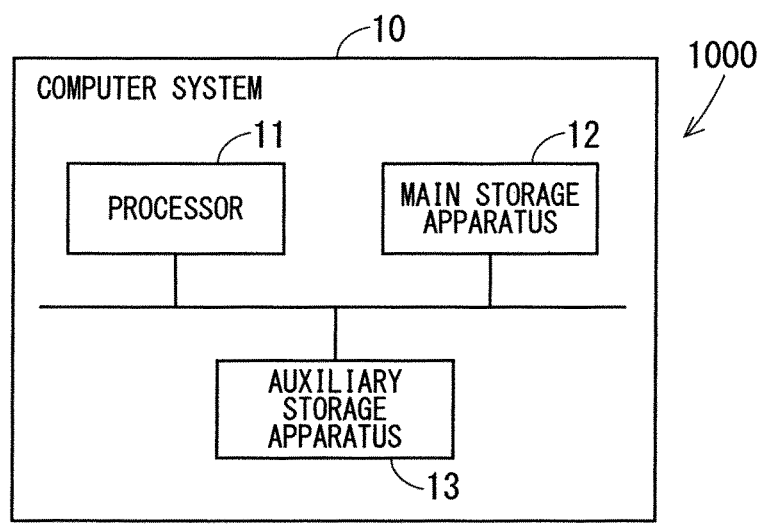

F I G. 2
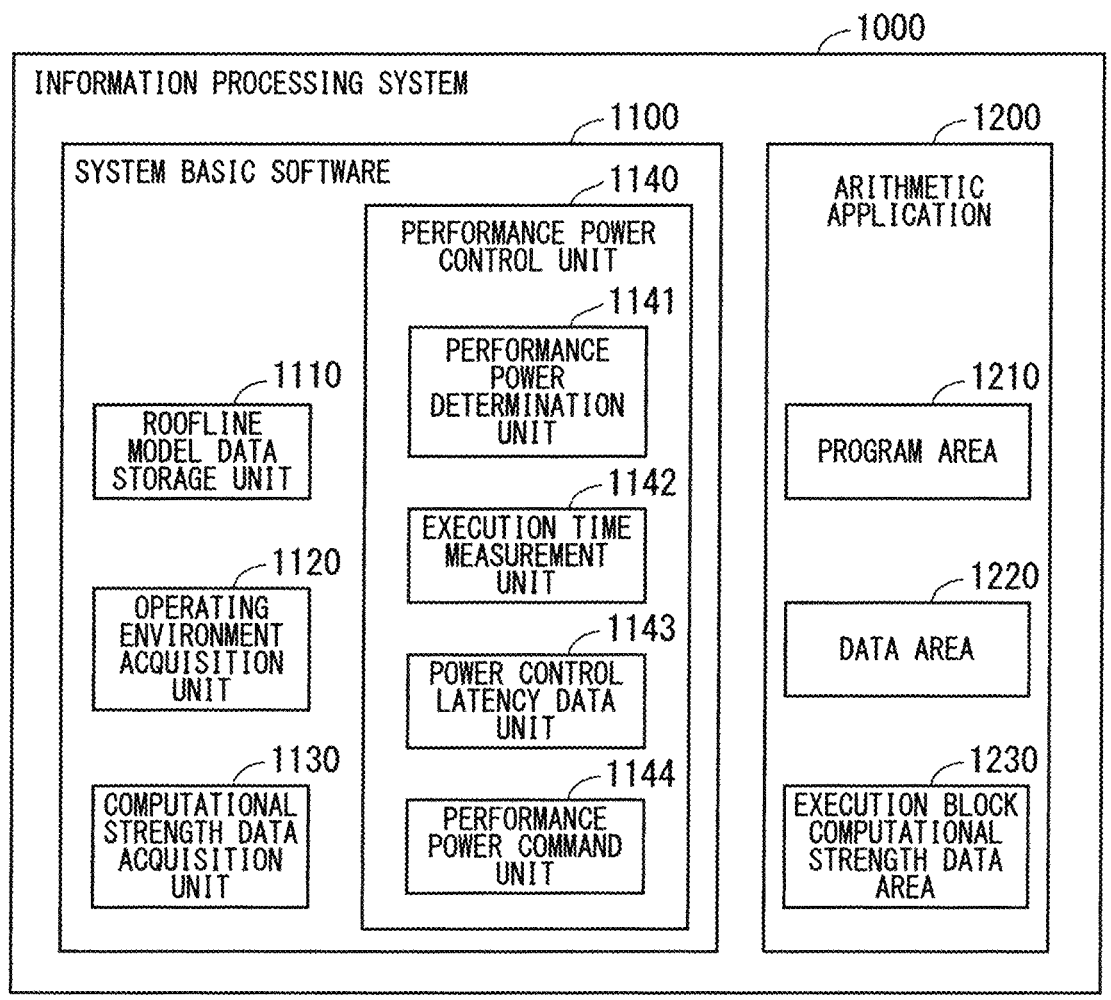

F I G. 5

RELATIONSHIP BETWEEN COMBINATION OF OPERATION FREQUENCY AND
NUMBER OF CORE OF PROCESSOR AND UPPER LIMIT VALUE
OF PERFORMANCE [GFlop/s]

| OPERATION FREQUENCY \ NUMBER OF CORES | 1 | 2 | ... | N |
|---|---|---|---|---|
| 2.6GHz | 5.78 | 11.56 | ... | 454.55 |
| 2.4GHz | 5.21 | 10.42 | ... | 397.46 |
| 1.8GHz | 3.64 | 7.28 | ... | 334.02 |
| 1.0GHz | 1.95 | 3.90 | ... | 157.95 |

FIG. 6

RELATIONSHIP BETWEEN OPERATION FREQUENCY OF MAIN
STORAGE APPARATUS AND BANDWIDTH [GB/s]

| FREQUENCY | BANDWIDTH |
|---|---|
| 2.6GHz | 25.4 |
| 1.8GHz | 16.4 |
| 1.0GHz | 10.6 |

F I G. 7

COMPUTATIONAL STRENGTH DATA AND DEADLINE TIME OF EACH EXECUTION BLOCK

| EXECUTION BLOCK | EXECUTION ADDRESS | COMPUTATIONAL STRENGTH DATA [Flop/Byte] | DEADLINE TIME [ms] |
|---|---|---|---|
| Block_A | 0x00000054 | 1.43 | 10 |
| Block_B | 0x000000f2 | 4.22 | 20 |
| ... | ... | ... | ... |
| Block_N | 0x00000109 | 0.53 | 10 |

F I G. 8
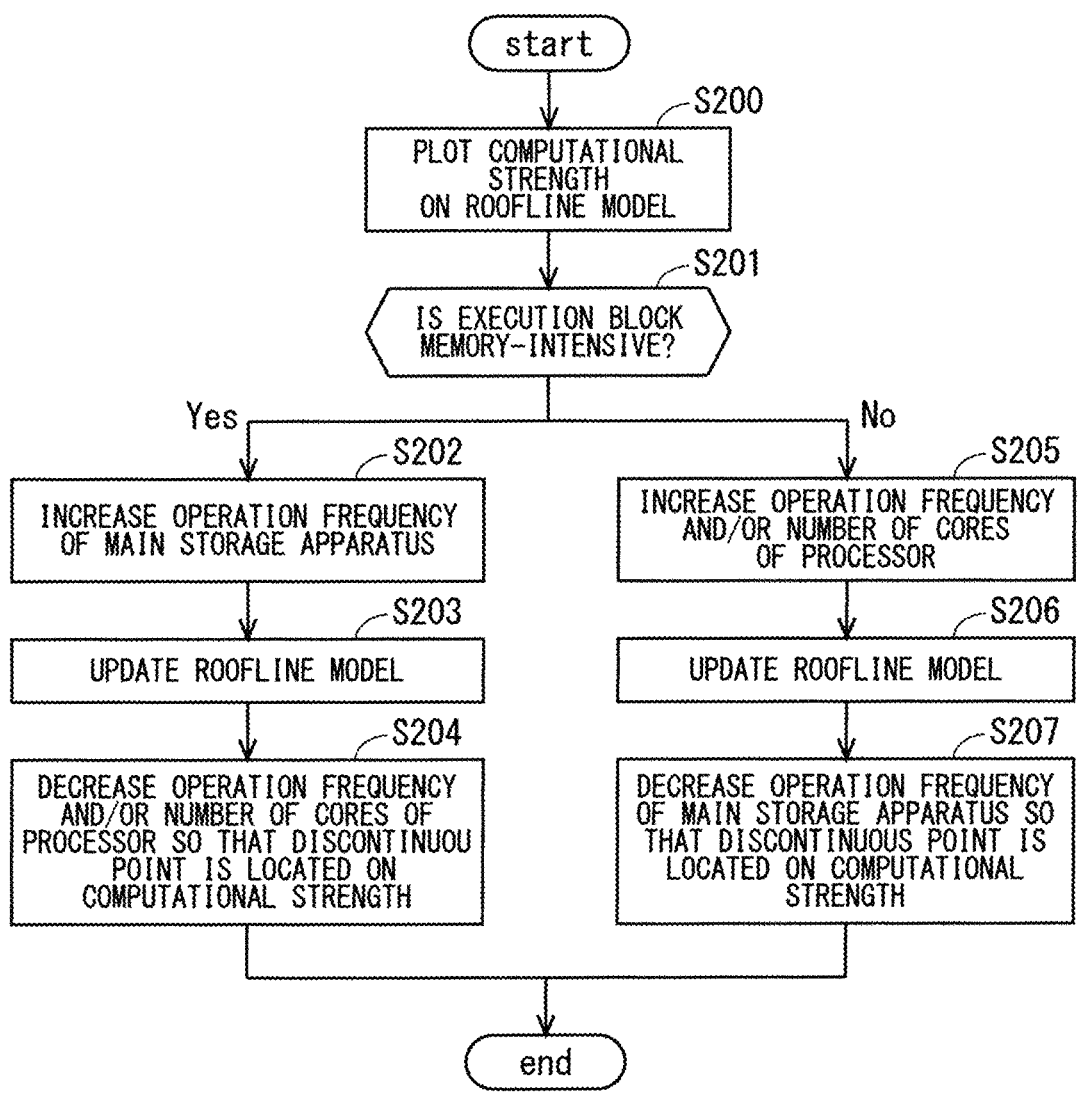

F I G. 1 1

OVERHEAD TIME OF EACH CONTROL

| CONTROL METHOD | OVERHEAD TIME [$\mu$s] |
|---|---|
| OPERATION FREQUENCY OF PROCESSOR | 40.5 |
| ON/OFF OF CORE OF PROCESSOR | 4205.7 |
| OPERATION FREQUENCY OF MAIN STORAGE APPARATUS | 87.3 |

INFORMATION PROCESSING SYSTEM AND INFORMATION PROCESSING SYSTEM CONTROL METHOD

CROSS-REFERENCE TO RELATED APPLICATION

The present application is based on PCT filing PCT/JP2020/022517, filed Jun. 8, 2020, the entire contents of which are incorporated herein by reference.

TECHNICAL FIELD

The present disclosure relates to an information processing system and an information processing system control method.

BACKGROUND ART

In recent years, in a processor mounted in an embedded system, to cope with increase in demand for more complicated and higher speed applications, improvement in performance has been planned by an increased operation frequency per core, multi-core configuration, a graphics processing unit (GPU), mounting of a plurality of arithmetic units by incorporation of a dedicated accelerator, and the like.

Further, a processor having a dynamic voltage and frequency scaling (DVFS) function, which is one of mechanisms for reducing power consumption, has also been developed. The DVFS function is realized by a power saving mechanism that causes a processor to have several types of operation frequencies and operation voltages and changes an operation frequency and operating voltage of the processor according to a load situation of the processor.

With evolution of a processor implemented in an embedded system, throughput is increasing. On the other hand, in an embedded system, heat dissipation control and downsizing of a device are expected as requirements. For this reason, it is required to perform power saving control of a processor while satisfying performance requirements of an application.

Conventionally, as power saving control of a processor, there is known a control method of monitoring a load state of the processor, operating the processor at a high frequency in a case where the load state of the processor is a high load, and operating the processor at a low frequency when the load state of the processor is a low load. Patent Document 1 proposes a method of performing control for lowering operation capability in a case where a memory bandwidth is dominant in terms of performance based on statistical information regarding memory performance. Patent Document 2 discloses a method of comparing an operation amount of a central processing unit (CPU) with an access amount to a cache memory, and enabling a power saving mechanism of a processor in a case where the latter is dominant.

PRIOR ART DOCUMENTS

Patent Documents

Patent Document 1: WO 2008/120274 A
Patent Document 2: Japanese Patent Application Laid-Open No. 2008-40734

SUMMARY

Problem to be Solved by the Invention

The method proposed by Patent Document 1 has a problem that since statistical information regarding memory access is used only inside a processor, power performance control with high accuracy adapted to an algorithm of an arithmetic application cannot be performed. Further, since computational strength of an arithmetic application is not used in the method, there is a problem that power saving control is delayed, and a frequency of a processor remains low particularly in a case where high arithmetic performance is required. Further, in the method, since only control of an operation frequency and a command issue width of a processor is performed, on/off control of a multi-core configuration and control of an operation frequency of a main storage apparatus are not performed, and there is a problem that sufficient power saving control cannot be performed.

The method proposed by Patent Document 2 has a problem that, with respect to an execution code executed by a computer, performance power control is not performed in an area where an execution ratio of a CPU is high, and thus excessive power is consumed in a main storage apparatus.

The present disclosure has been made in view of these problems. An object of the present disclosure is to enable performance power control adapted to an algorithm of an arithmetic application. Further, an object of the present disclosure is to prevent a delay in performance power control.

Means to Solve the Problem

The present disclosure relates to an information processing system.

The information processing system includes an execution block computational strength data area, a roofline model data storage unit, a computational strength data acquisition unit, and a performance power control unit.

The execution block computational strength data area holds computational strength data of each execution block constituting an arithmetic application that operates in an operating environment of a computer system including a processor including a power saving mechanism and a main storage apparatus.

The roofline model data storage unit holds a roofline model corresponding to an operation frequency and the number of cores of the processor, and an operation frequency of the main storage apparatus.

The computational strength data acquisition unit acquires computational strength data of each execution block from the execution block computational strength data area.

The performance power control unit controls an operation frequency and the number of cores of the processor and an operation frequency of the main storage apparatus based on the roofline model and the computational strength data of each execution block.

The present disclosure is also directed to an information processing system control method.

Effects of the Invention

According to the present disclosure, performance power control is performed on the basis of computational strength data of each execution block constituting an arithmetic application. This enables performance power control adapted to an algorithm of an arithmetic application. Further, performance power control is performed in a feedforward manner based on computational strength data defined in advance. This can prevent a delay in performance power control.

An object, a feature, an aspect, and an advantage of the present disclosure will become clearer from detailed description below and the accompanying drawings.

BRIEF DESCRIPTION OF DRAWINGS

FIG. 1 is a block diagram schematically illustrating a hardware configuration of an information processing system according to a first embodiment.

FIG. 2 is a block diagram schematically illustrating a functional configuration of the information processing system of the first embodiment.

FIG. 5 is a diagram illustrating a relationship between a combination of a selectable operation frequency of a processor and the number of cores constituting a roofline model held in the roofline model data storage unit included in the information processing system of the first embodiment and an upper limit value of performance of floating point operation.

FIG. 6 is a diagram illustrating a relationship between a selectable operation frequency and a bandwidth of a main storage apparatus constituting the roofline model held in the roofline model data storage unit included in the information processing system of the first embodiment.

FIG. 7 is a diagram illustrating an example of information held in an execution block computational strength data area included in the information processing system of the first embodiment.

FIG. 8 is a flowchart illustrating a process of operation of a performance power determination unit included in the information processing system of the first embodiment.

FIG. 11 is a diagram illustrating an example of overhead time required to perform each control in the information processing system of the first embodiment.

DESCRIPTION OF EMBODIMENTS

First Embodiment

Figure 3:
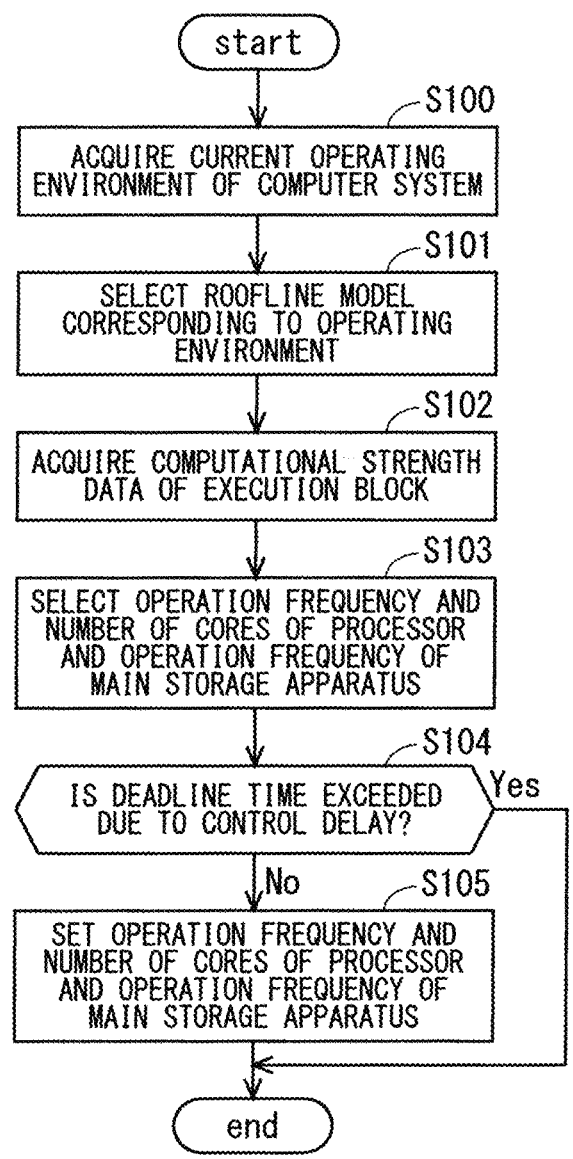
FIG. 3 is a flowchart illustrating a process of operation of system basic software installed in the information processing system of the first embodiment.

FIG. 1 is a block diagram schematically illustrating a hardware configuration of an information processing system according to a first embodiment.

As illustrated in FIG. 1, an information processing system 1000 of the first embodiment includes a computer system 10.

As illustrated in FIG. 1, the computer system 10 includes a processor 11, a main storage apparatus 12, and an auxiliary storage apparatus 13.

The processor 11 includes a central processing unit (CPU), a graphics processing unit (GPU), a digital signal processor (DSP), and the like. The processor 11 includes a power saving mechanism. The power saving mechanism dynamically changes an operation frequency and/or the number of cores of the processor 11.

The main storage apparatus 12 is a random access memory (RAM) or the like.

The auxiliary storage apparatus 13 is a hard disk drive, a solid state drive, a RAM disk, or the like.

FIG. 2 is a block diagram schematically illustrating a functional configuration of the information processing system of the first embodiment.

As illustrated in FIG. 2, system basic software 1100 and an arithmetic application 1200 are installed in the information processing system 1000.

The system basic software 1100 and the arithmetic application 1200 operate in an operating environment of the computer system 10. The system basic software 1100 may be an operating system. There is no restriction on an algorithm of the arithmetic application 1200. The algorithm is an algorithm that performs vehicle control of a self-driving vehicle executed at a constant cycle or the like.

As illustrated in FIG. 2, the information processing system 1000 includes a roofline model data storage unit 1110, an operating environment acquisition unit 1120, a computational strength data acquisition unit 1130, and a performance power control unit 1140. These elements are configured by the processor 1 executing the system basic software 1100 loaded from the auxiliary storage apparatus 13 to the main storage apparatus 12.

The roofline model data storage unit 1110 holds performance information on the computer system 10.

The operating environment acquisition unit 1120 acquires a current operating environment of the computer system 10.

The computational strength data acquisition unit 1130 acquires computational strength data of each execution block constituting the arithmetic application 1200 from an execution block computational strength data area 1230 described below.

The performance power control unit 1140 performs performance power control on the basis of performance information being held and acquired computational strength data of each execution block.

In the first embodiment, performance information related to the computer system 10 being held includes an operation frequency and the number of cores of the processor 11 and a roofline model corresponding to an operation frequency of the main storage apparatus 12. Further, an acquired current operating environment of the computer system 10 includes a current operation frequency and the number of cores of the processor 11 and a current operation frequency of the main storage apparatus 12. Further, performing performance power control on the basis of performance information and computational strength data of each execution block includes controlling an operation frequency and the number of cores of the processor 11 and an operation frequency of the main storage apparatus 12 on the basis of a roofline model included in the performance information and computational strength data of each execution block. Using a current operating environment of the computer system 10 includes using a current operation frequency and the number of cores of the processor 11 and a current operation frequency of the main storage apparatus 12 that are included in a current operating environment of the computer system 10.

The performance power control unit 1140 includes a performance power determination unit 1141, an execution time measurement unit 1142, a power control latency data unit 1143, and a performance power command unit 1144.

The performance power determination unit 1141 determines a policy of performance power control from a held roofline model and computational strength data of each execution block.

The execution time measurement unit 1142 measures execution time of each execution block.

The power control latency data unit 1143 determines whether or not to cause the performance power command unit 1144 to perform performance power control from overhead time required in a case where the performance power control is caused to be performed by the performance power command unit 1144.

The performance power command unit 1144 outputs a control command according to a determined policy of performance power control. The performance power command unit 1144 outputs a control command in a case where the power control latency data unit 1143 determines to cause the performance power command unit 1144 to perform the performance power control.

In the first embodiment, a policy of performance power control to be determined includes an operation frequency and the number of cores of the processor 11 and an operation frequency of the main storage apparatus 12. Further, following a determined policy of performance power control includes following an operation frequency and the number of cores of the processor 11 and an operation frequency of the main storage apparatus 12 included in the determined policy of performance power control. Further, outputting a control command is performed to control an operation frequency and the number of cores of the processor 11, and an operation frequency of the main storage apparatus 12.

As illustrated in FIG. 2, the information processing system 1000 includes a program area 1210, a data area 1220, and the execution block computational strength data area 1230. These elements are secured in at least one of the main storage apparatus 12 and the auxiliary storage apparatus 13.

The program area 1210 holds a program constituting the arithmetic application 1200.

The data area 1220 holds a variable, an array, and the like constituting the arithmetic application 1200.

The execution block computational strength data area 1230 holds computational strength data of each execution block constituting the arithmetic application 1200 and deadline time of each execution block. The deadline time of each execution block indicates a time at which processing of each execution block needs to be ended.

In the information processing system 1000, performance power control is performed on the basis of computational strength data of each execution block constituting the arithmetic application 1200. This enables performance power control adapted to an algorithm of the arithmetic application 1200.

Further, in the information processing system 1000, performance power control is performed in a feedforward manner on the basis of computational strength data defined in advance. This can prevent a delay in performance power control.

Further, in the information processing system 1000, an operation frequency of the main storage apparatus 12 is controlled. In this manner, it is possible to suppress consumption of more power than necessary by the main storage apparatus 12.

FIG. 3 is a flowchart illustrating a process of operation of system basic software installed in the information processing system of the first embodiment.

The system basic software 1100 executes Steps S100 to S105 illustrated in FIG. 3.

In Step S100, the operating environment acquisition unit 1120 acquires a current operating environment of the computer system 10. At that time, the operating environment acquisition unit 1120 acquires a current operation frequency and the number of cores of the processor 11 and a current operation frequency of the main storage apparatus 12.

In subsequent Step S101, the operating environment acquisition unit 1120 selects a roofline model corresponding to the acquired current operating environment of the computer system 10.

According to Steps S100 and S101, it is possible to refer to a roofline model corresponding to a current operating environment of the computer system 10.

In subsequent Step S102, the computational strength data acquisition unit 1130 acquires computational strength data of an execution block to be executed next.

In subsequent Step S103, the performance power control unit 1140 collates a selected roofline model with the acquired computational strength data of the execution block. Further, the performance power control unit 1140 selects an operating environment of the computer system 10. At that time, the performance power control unit 1140 selects an operation frequency and the number of cores of the processor 11, and an operation frequency of the main storage apparatus 12.

In subsequent Step S104, the performance power control unit 1140 determines whether execution time of an execution block exceeds the deadline time due to control delay in a case where an operating environment of the computer system 10 is changed from a current operating environment to the operating environment selected in Step S103. The control delay is generated by overhead time that occurs in a case where an operating environment of the computer system 10 is changed from a current operating environment to the selected operating environment.

In a case where the execution time of an execution block is determined to exceed the deadline time, the performance power control unit 1140 ends the operation without executing Step S105. In a case where the execution time of an execution block is determined not to exceed the deadline time, the performance power control unit 1140 ends the operation after executing Step S105.

In Step S105, the performance power control unit 1140 performs performance power control. At that time, the performance power control unit 1140 sets an operation frequency and the number of cores of the processor 11 and an operation frequency of the main storage apparatus 12 to those selected.

Figure 4:
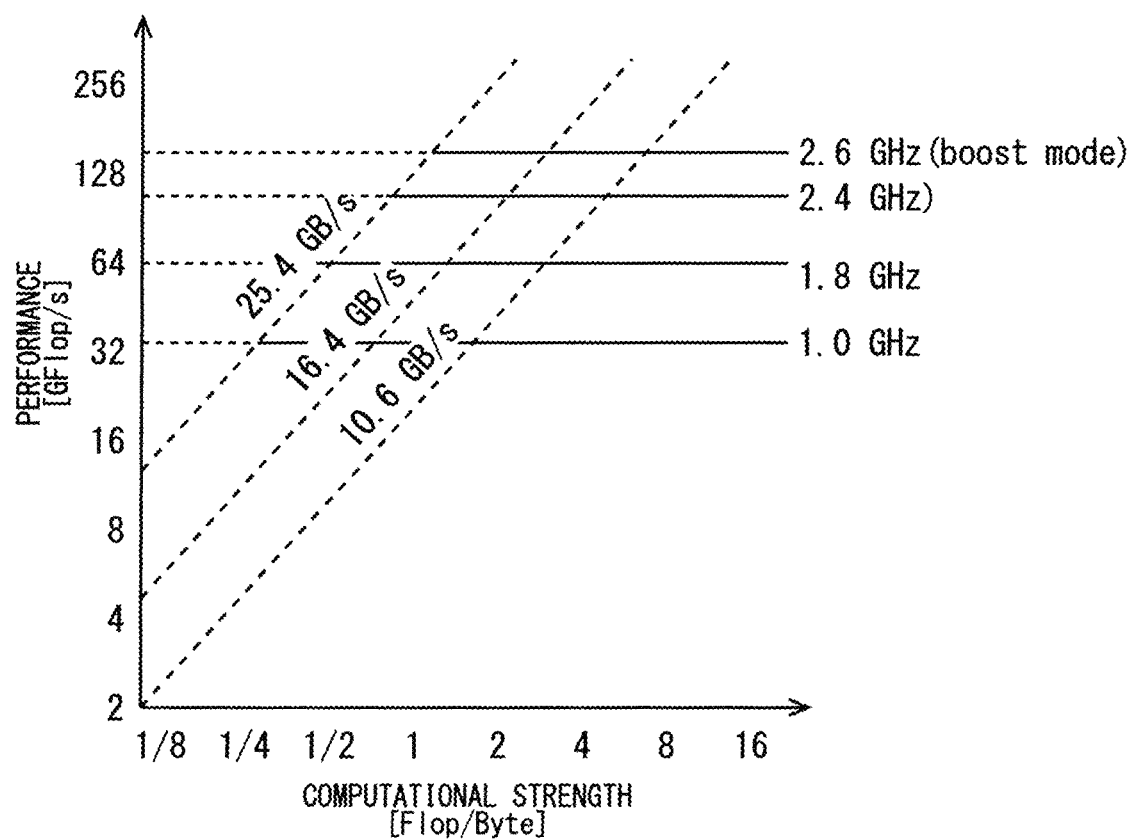
FIG. 4 is a diagram illustrating an example of a roofline model held in a roofline model data storage unit included in the information processing system of the first embodiment.

FIG. 4 is a diagram illustrating an example of a roofline model held in a roofline model data storage unit included in the information processing system of the first embodiment. In the diagram, computational strength is taken on the horizontal axis. Further, performance of floating point operation is taken on the vertical axis.

One roofline model exists for one of the computer system 10, and has content corresponding to the processor 11 and the main storage apparatus 12 included in one of the computer system 10. The roofline model defines an upper limit value of performance of floating point operation with respect to computational strength for each of selectable arithmetic performances of the processor 11 and each of selectable memory performances of the main storage apparatus 12. The roofline model may define an upper limit value of performance other than performance of floating point operation. Arithmetic performance of the processor 11 is a combination of an operation frequency of the processor 11 and the number of cores, or the like. Memory performance of the main storage apparatus 12 is an operation frequency or the like of the main storage apparatus 12. In a case where arithmetic performance of the processor 11 is a combination of an operation frequency and the number of cores of the processor 11 and memory performance of the main storage apparatus 12 is an operation frequency of the main storage apparatus 12, it is possible to refer to roofline data corresponding to the combination of the operation frequency and the number of cores of the processor 11 and the operation frequency of the main storage apparatus 12. In the example illustrated in FIG. 4, a roofline model defines an upper limit value of performance of floating point operation with respect to computational strength for each of selectable operation frequencies "2.6 GHz", "2.4 GHz", "1.8 GHz", and "1.0 GHz" of the processor 11 and each of bandwidths "25.4 GB/s", "16.4 GB/s", and "10.6 GB/s" corresponding to a selectable operation frequency of the main storage apparatus 12. According to the roofline model, it is possible to visually determine which one of the arithmetic performance of the processor 11 and the memory performance of the main storage apparatus 12 is dominant in performance of floating point operation when an execution block constituting the arithmetic application 1200 is executed from computational strength of the execution block. Details of a roofline model are described in Samuel Williams, Andrew Waterman and David Patterson, "Roofline: An Informal Visual Performance Model for Floating-Point Programs and Multicore, (2009)".

FIG. 5 is a diagram illustrating a relationship between a combination of a selectable operation frequency of a processor and the number of cores constituting a roofline model held in the roofline model data storage unit included in the information processing system of the first embodiment and an upper limit value of performance of floating point operation.

As described above, the roofline model defines an upper limit value of performance of floating point operation with respect to computational strength for each of selectable arithmetic performances of the processor 11. However, in an upper limit value of performance of floating point operation with respect to computational strength defined for each of selectable arithmetic performances of the processor 11, the upper limit value of the performance of the floating point operation does not depend on the computational strength. For this reason, by defining an upper limit value of performance of floating point operation for each of selectable arithmetic performances of the processor 11, an upper limit value of performance of floating point operation with respect to computational strength can be defined for each of selectable arithmetic performances of the processor 11. For example, based on a relationship between a combination of a selectable operation frequency and the number of cores of the processor 11 and an upper limit value of performance of floating point operation illustrated in FIG. 5, an upper limit value of performance of floating point operation with respect to computational strength for each combination of a selectable operation frequency and the number of cores of the processor 11.

FIG. 6 is a diagram illustrating a relationship between a selectable operation frequency and a bandwidth of a main storage apparatus constituting the roofline model held in the roofline model data storage unit included in the information processing system of the first embodiment.

As described above, the roofline model defines an upper limit value of performance of floating point operation with respect to computational strength for each of selectable memory performances of the main storage apparatus 12. However, a bandwidth of the main storage apparatus 12 has a one-to-one relationship with an operation frequency of the main storage apparatus 12. For this reason, by defining an upper limit value of performance of floating point operation with respect to computational strength for each of selectable bandwidths and preparing a relationship between a selectable operation frequency and a bandwidth of the main storage apparatus illustrated in FIG. 6, an upper limit value of performance of floating point operation with respect to computational strength for each of selectable operation frequencies of the main storage apparatus 12 can be defined.

FIG. 7 is a diagram illustrating an example of information held in an execution block computational strength data area included in the information processing system of the first embodiment.

As illustrated in FIG. 7, the execution block computational strength data area 1230 holds an execution address of each execution block, computational strength data of each execution block, and deadline time of each execution block.

According to the information illustrated in FIG. 7, it is possible to perform performance power control in consideration of performance and power consumption with finer granularity. Further, computational strength data of a desired execution block can be acquired without the user changing a source code file of the arithmetic application 1200.

When the information illustrated in FIG. 7 is created, a file including information by which an execution block can be identified and data in which computational strength data and deadline time are paired is created in advance. The file is created as a file different from a source code file of the arithmetic application 1200. The information by which an execution block can be identified is a name or the like of a function corresponding to the execution block.

Subsequently, compiling is performed, and an executable file of the arithmetic application 1200 is created from a source code file of the arithmetic application 1200 and the created file. In a case where an executable and linkable format (ELF) is employed, a section dedicated to computational strength data of each execution block may be newly provided as the execution block computational strength data area 1230 in the executable file. In this case, information of the newly created section is added to an ELF header and a section header.

When compiling is performed, a corresponding machine language portion in the program area 1210 is identified from the information by which an execution block can be identified, and an instruction for causing software interrupt is inserted into the identified machine language portion. In a case where the processor 11 is an x86 processor, the instruction for causing software interrupt is an INT3 instruction or the like. The instruction for causing software interrupt can replace a first byte of an original instruction as a breakpoint. Further, an execution address of the identified machine language portion is acquired, and the acquired execution address is added to the execution block computational strength data area 1230.

Separately from these, before the arithmetic application 1200 is executed, an interrupt handler that executes a series of pieces of processing included in the performance power control unit 1140 is registered in a corresponding interrupt number in an interrupt descriptor table.

In this manner, when the arithmetic application 1200 is loaded into the main storage apparatus 12 by the system basic software 1100 and executed by the processor 11, a software interrupt occurs every time each block is reached. The loading and execution of the arithmetic application 1200 are started by an exec memory in an UNIX (registered trademark) environment. For example, in a case where the instruction that causes the software interrupt is the INT3 instruction, a SIGTRAP signal is notified to the system basic software 1100. In the system basic software 1100, an interrupt handler registered in advance in the interrupt descriptor table is activated in conjunction with occurrence of a software interrupt, and a series of pieces of processing included in the performance power control unit 1140 are executed. At this time, the computational strength data acquisition unit 1130 acquires computational strength data of each execution block and deadline time of each execution block based on an execution address of each execution block. At that time, the computational strength data acquisition unit 1130 identifies an execution block corresponding to an address currently executed loaded into the main storage apparatus 12 from the address, and acquires computational strength data of the identified execution block and deadline time of the execution block. Further, the computational strength data acquisition unit 1130 passes the acquired computational strength data of each execution block and the deadline time of each execution block to the performance power determination unit 1141.

FIG. 8 is a flowchart illustrating a process of operation of the performance power determination unit included in the information processing system of the first embodiment.

The performance power control unit 1140 receives a roofline model corresponding to a current operating environment from the roofline model data storage unit 1110, receives computational strength data and deadline time of an execution block to be executed next from the computational strength data acquisition unit 1130, and then executes Steps S200 to S207 illustrated in FIG. 8.

In Step S200, the performance power determination unit 1141 plots the received computational strength data of the execution block on the received roofline model. Further, the performance power determination unit 1141 collates the computational strength data of the execution block with the roofline model.

In subsequent Step S201, the performance power determination unit 1141 determines whether or not the execution block is memory-intensive. The performance power determination unit 1141 determines which one of memory performance of the main storage apparatus 12 and arithmetic performance of the processor 11 is a rate-limiting factor in a performance aspect of the arithmetic application 1200. In a case of determining that the memory performance of the main storage apparatus 12 is a rate-limiting factor, the performance power determination unit 1141 determines that the execution block is memory-intensive. In a case of determining that the arithmetic performance of the processor 11 is a rate-limiting factor, the performance power determination unit 1141 determines that the execution block is not memory-intensive, that is, is computation-intensive.

In a case where it is determined that the execution block is memory-intensive, Steps S202 to S204 are executed. In a case where it is determined that the execution block is not memory-intensive, Steps S205 to S207 are executed.

In Step S202, the performance power determination unit 1141 increases an operation frequency of the main storage apparatus 12. At that time, the performance power determination unit 1141 selects an operation frequency higher than a current operation frequency of the main storage apparatus 12 from selectable operation frequencies of the main storage apparatus 12 held in the roofline model data storage unit 1110.

In subsequent Step S203, the performance power determination unit 1141 updates the roofline model. At that time, the performance power determination unit 1141 updates the roofline model based on the selected operation frequency of the main storage apparatus 12.

In subsequent Step S204, the performance power determination unit 1141 decreases the operation frequency and/or the number of cores of the processor 11 so that a discontinuous point between a gradient portion of the roofline model and a flat portion of the roofline model is located on the computational strength. At that time, the performance power determination unit 1141 selects an operation frequency and/or the number of cores smaller than the current operation frequency and/or number of cores of the processor 11 from a selectable operation frequency and/or number of cores of the processor 11 held in the roofline model data storage unit 1110.

The gradient portion of the roofline model exists in a range of computational strength in which the memory performance of the main storage apparatus 12 is a rate-limiting factor. The flat portion of the roofline model exists in a range of computational strength in which the arithmetic performance of the processor 11 is a rate-limiting factor.

In Step S205, the performance power determination unit 1141 increases the operation frequency and/or the number of cores of the processor 11. At that time, the performance power determination unit 1141 selects an operation frequency and/or the number of cores larger than the current operation frequency and/or number of cores of the processor 11 from a selectable operation frequency and/or number of cores of the processor 11 held in the roofline model data storage unit 1110.

In subsequent Step S206, the performance power determination unit 1141 updates the roofline model. At that time, the performance power determination unit 1141 updates the roofline model based on the selected operation frequency and/or number of cores of the processor 11.

In subsequent Step S207, the performance power determination unit 1141 lowers the operation frequency of the main storage apparatus 12 so that a discontinuity point between the gradient portion of the roofline model and the flat portion of the roofline model is located on the computational strength. At that time, the performance power determination unit 1141 selects an operation frequency lower than a current operation frequency of the main storage apparatus 12 from selectable operation frequencies of the main storage apparatus 12 held in the roofline model data storage unit 1110.

Figure 9:
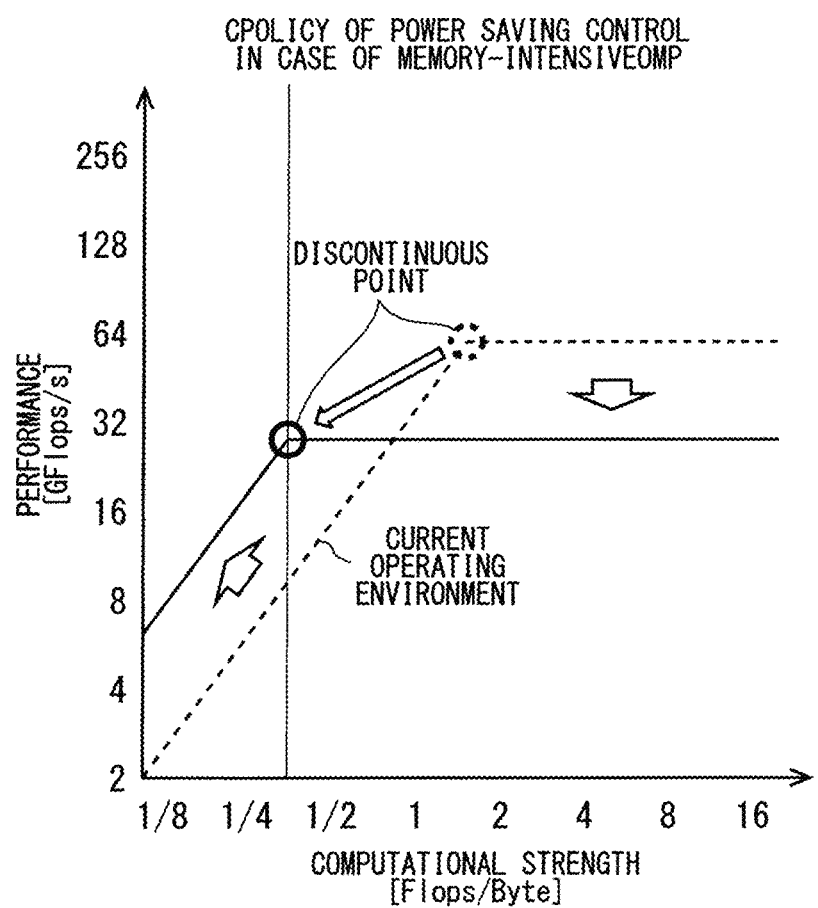
FIG. 9 is a diagram illustrating an example of a policy of power saving control in a case where an execution block is memory-intensive performed by the information processing system of the first embodiment.

FIG. 9 is a diagram illustrating an example of a policy of power saving control in a case where an execution block is memory-intensive performed by the information processing system of the first embodiment.

In the example of a policy of power saving control illustrated in FIG. 9, with respect to the current memory performance of the main storage apparatus 12 and arithmetic performance of the processor 11 illustrated by a broken line, it is determined to increase the memory performance of the main storage apparatus 12, which is an obstacle to performance when an execution block is executed, to memory performance of the main storage apparatus 12 illustrated by a solid line gradient portion, and a performance requirement is satisfied. Further, it is determined to lower the arithmetic performance of the processor 11 to arithmetic performance of the processor 11 illustrated by a solid line flat portion so that a discontinuous point between the gradient portion and the flat portion is located on the computational strength, and power saving is achieved. In this manner, the memory performance of the main storage apparatus 12 and the arithmetic performance of the processor 11 are selected such that the memory performance of the main storage apparatus 12 and the arithmetic performance of the processor 11 shift to the memory performance of the main storage apparatus 12 and the arithmetic performance of the processor 11 illustrated by the solid line.

Figure 10:
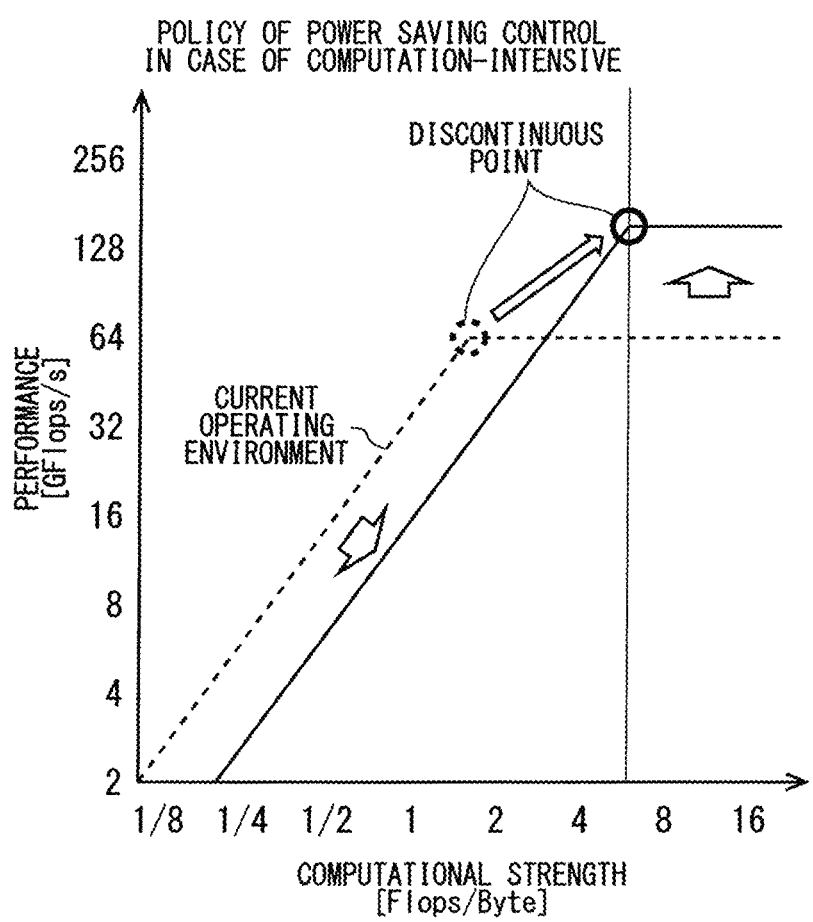
FIG. 10 is a diagram illustrating an example of a policy of power saving control in a case where an execution block is computation-intensive performed by the information processing system of the first embodiment.

FIG. 10 is a diagram illustrating an example of a policy of power saving control in a case where an execution block is computation-intensive performed by the information processing system of the first embodiment.

In the example of a policy of power saving control illustrated in FIG. 10, with respect to the current memory performance of the main storage apparatus 12 and arithmetic performance of the processor 11 illustrated by a broken line, it is determined to increase the memory performance of the processor 11, which is an obstacle to performance when an execution block is executed, to arithmetic performance of the processor 11 illustrated by a solid line flat portion, and a performance requirement is satisfied. Further, it is determined to lower the memory performance of the main storage apparatus 12 to the memory performance of the main storage apparatus 12 illustrated by the solid line gradient portion so that a discontinuous point between the gradient portion and the flat portion is located on the computational strength, and power saving is achieved. In this manner, the memory performance of the main storage apparatus 12 and the arithmetic performance of the processor 11 are selected such that the memory performance of the main storage apparatus 12 and the arithmetic performance of the processor 11 shift to the memory performance of the main storage apparatus 12 and the arithmetic performance of the processor 11 illustrated by the solid line.

According to the policy of power saving control illustrated in FIGS. 9 and 10, power saving can be performed while satisfying a necessary performance requirement.

FIG. 11 is a diagram illustrating an example of overhead time required to perform each control in the information processing system of the first embodiment.

The overhead time taken to perform each control illustrated in FIG. 11 is predefined. The overhead time required to perform each control includes overhead time required to control an operation frequency of the processor 11, ON/OFF of a core of the processor 11, and an operation frequency of the main storage apparatus 12.

Figure 12:
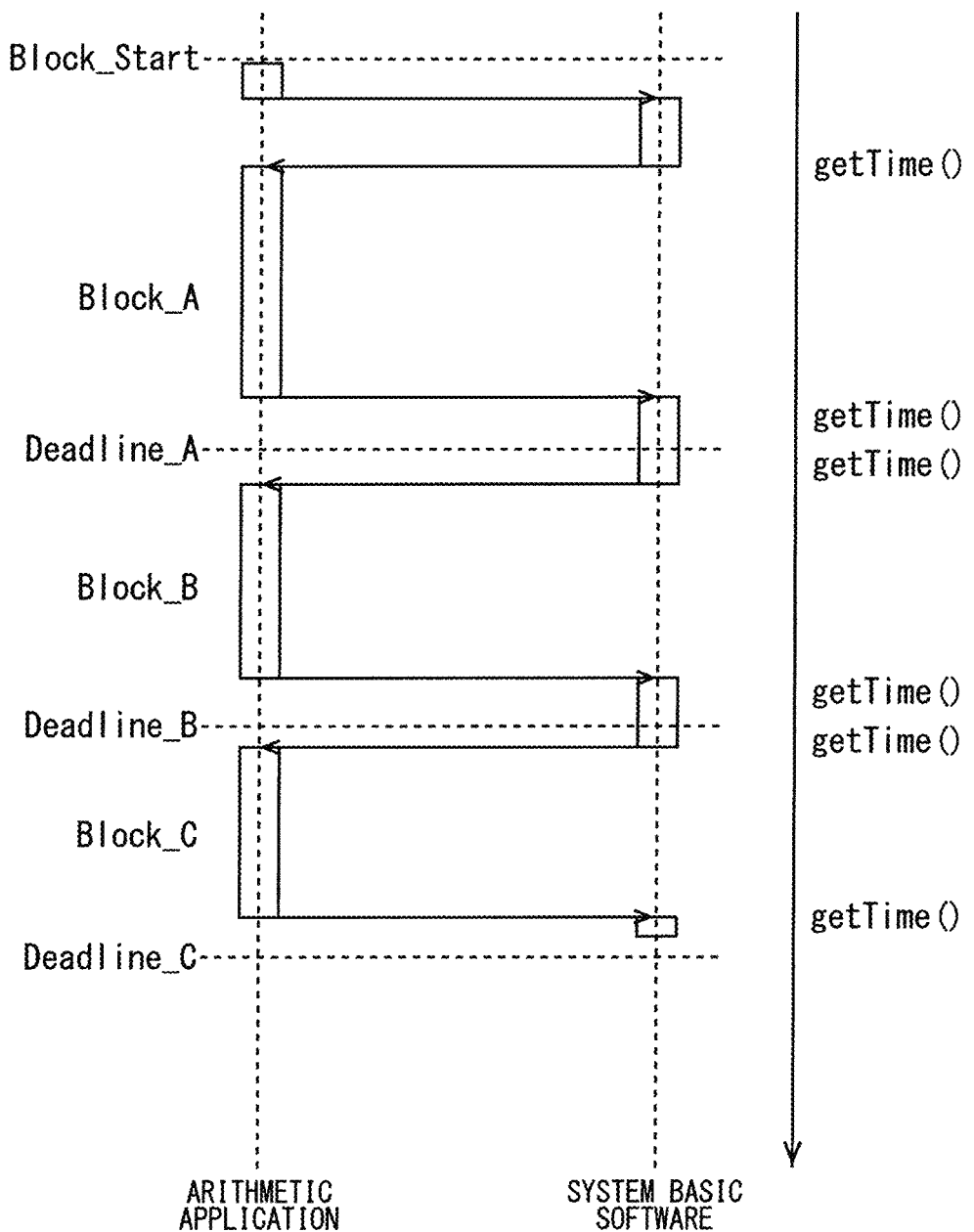
FIG. 12 is a diagram illustrating a procedure of operation of a power control latency data unit and a performance power command unit included in the information processing system of the first embodiment.

FIG. 12 is a diagram illustrating a procedure of operation of the power control latency data unit and the performance power command unit included in the information processing system of the first embodiment.

As illustrated in FIG. 12, processing related to performance power control by the system basic software 1100 is executed before each execution block constituting the arithmetic application is executed by software interrupt.

After the processing related to performance power control is executed by the system basic software 1100, the execution time measurement unit 1142 can measure execution time of each execution block by acquiring a current time before and after the processing. The power control latency data unit 1143 holds the measured execution time of each execution block. Further, the power control latency data unit 1143 determines whether or not to perform performance power control from the measured execution time of each execution block and the overhead time required to perform each control illustrated in FIG. 11. In the first embodiment, in a case where the sum of execution time and overhead time of an execution block in a previous cycle does not exceed deadline time of the execution block acquired by the computational strength data acquisition unit 1130, the power control latency data unit 1143 outputs a command to perform performance power control for the execution block to the performance power command unit 1144. On the other hand, if not, the power control latency data unit 1143 outputs a command not to perform performance power control for the execution block to the performance power command unit 1144.

In this manner, it is possible to perform performance power control for each execution block while complying with deadline time of each execution block.

Second Embodiment

Hereinafter, differences between a second embodiment and the first embodiment will be described. Regarding points not described, the configuration employed in the first embodiment is also employed in the second embodiment.

In the first embodiment, performance power control is performed from the roofline model corresponding to a current operating environment of the computer system 10 based only on computational strength data of each execution block constituting the arithmetic application 1200. The operating environment is an operation frequency and the number of cores of the processor 11 and an operation frequency of the main storage apparatus 12. However, actual performance when the arithmetic application 1200 is executed does not necessarily coincide with limit performance of the computer system 10 indicated by the roofline model.

In view of the above, in the second embodiment, performance power control with higher accuracy is realized by using actual arithmetic performance when the arithmetic application 1200 is executed in addition to computational strength data of each execution block constituting the arithmetic application 1200. Hereinafter, the arithmetic performance to be used is referred to as "actual arithmetic performance".

The actual arithmetic performance of each execution block can be obtained by dividing the total number of floating point operations identified from computational strength data of each execution block acquired by the computational strength data acquisition unit 1130 by execution time of each execution block held by the power control latency data unit 1143.

Figure 13:
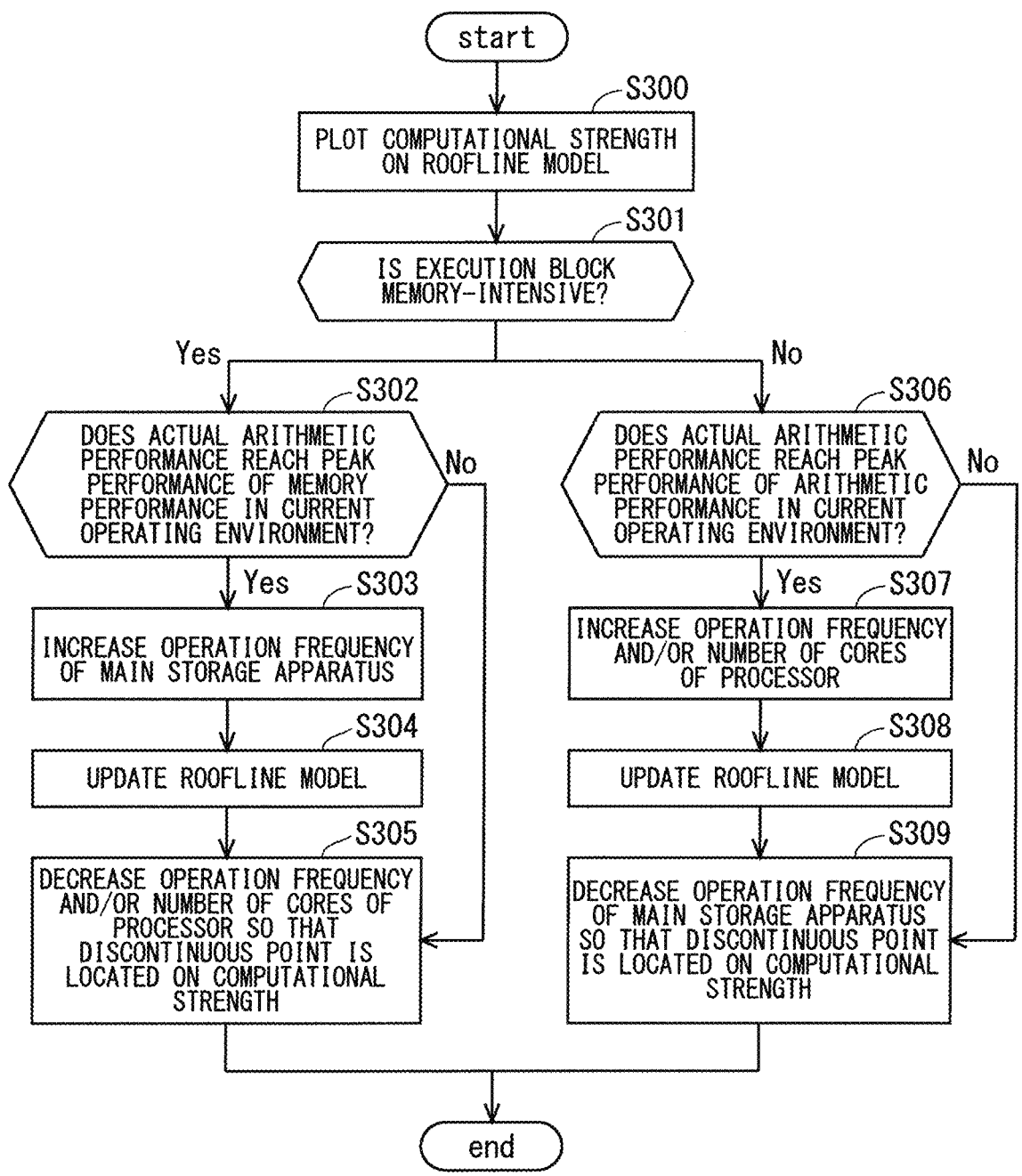
FIG. 13 is a flowchart illustrating a process of operation of the performance power determination unit included in the information processing system of the second embodiment.

FIG. 13 is a flowchart illustrating a process of operation of the performance power determination unit included in the information processing system of the second embodiment.

The performance power control unit 1140 executes Steps S300 to S309 illustrated in FIG. 13.

In Step S300, the performance power determination unit 1141 plots the received computational strength data of an execution block on the received roofline model. Further, the performance power determination unit 1141 collates the computational strength data of the execution block with the roofline model.

In subsequent Step S301, the performance power determination unit 1141 determines whether or not the execution block is memory-intensive.

In a case where it is determined that the execution block is memory-intensive, Steps S302 to S305 are executed. In a case where it is determined that the execution block is not memory-intensive, Steps S306 to S309 are executed.

In Step S302, the performance power determination unit 1141 determines whether or not the actual arithmetic performance of the execution block reaches peak performance of memory performance of the main storage apparatus 12 in a current operating environment.

In a case where it is determined that the actual arithmetic performance of the execution block reaches the peak performance of the memory performance of the main storage apparatus 12, Steps S303 to S305 are executed. In a case where it is determined that the actual arithmetic performance of the execution block does not reach the peak performance of the memory performance, Step S305 is executed.

In Step S303, the performance power determination unit 1141 increases an operation frequency of the main storage apparatus 12. At that time, the performance power determination unit 1141 selects an operation frequency higher than a current operation frequency of the main storage apparatus 12 from selectable operation frequencies of the main storage apparatus 12 held in the roofline model data storage unit 1110.

In subsequent Step S304, the performance power determination unit 1141 updates the roofline model. At that time, the performance power determination unit 1141 updates the roofline model based on the selected operation frequency of the main storage apparatus 12.

In subsequent Step S305, the performance power determination unit 1141 decreases the operation frequency and/or the number of cores of the processor 11 so that a discontinuous point between a gradient portion of the roofline model and a flat portion of the roofline model is located on the computational strength. At that time, the performance power determination unit 1141 selects an operation frequency and/or the number of cores smaller than the current operation frequency and/or number of cores of the processor 11 from a selectable operation frequency and/or number of cores of the processor 11 held in the roofline model data storage unit 1110.

In Steps S302 to S305, in a case where the actual arithmetic performance of the execution block does not reach the peak performance of the memory performance of the main storage apparatus 12, it is determined that a current operating environment satisfies a requirement for the memory performance of the main storage apparatus 12 with respect to an operation frequency of the main storage apparatus 12, and the selection is not performed.

In Step S306, the performance power determination unit 1141 determines whether or not the actual arithmetic performance of the execution block reaches peak performance of arithmetic performance of the processor 11 in a current operating environment.

When it is determined that the actual arithmetic performance of the execution block reaches the peak performance of the arithmetic performance of the processor 11, Steps S307 to S309 are executed. When it is determined that the actual arithmetic performance of the execution block reaches the peak performance of the arithmetic performance of the processor 11, Step S309 is executed.

In Step S307, the performance power determination unit 1141 increases the operation frequency and/or the number of cores of the processor 11. At that time, the performance power determination unit 1141 selects an operation frequency and/or the number of cores larger than the current operation frequency and/or number of cores of the processor 11 from a selectable operation frequency and/or number of cores of the processor 11 held in the roofline model data storage unit 1110.

In subsequent Step S308, the performance power determination unit 1141 updates the roofline model. At that time, the performance power determination unit 1141 updates the roofline model based on the selected operation frequency and/or number of cores of the processor 11.

In subsequent Step S309, the performance power determination unit 1141 lowers the operation frequency of the main storage apparatus 12 so that a discontinuity point between the gradient portion of the roofline model and the flat portion of the roofline model is located on the computational strength. At that time, the performance power determination unit 1141 selects an operation frequency lower than a current operation frequency of the main storage apparatus 12 from selectable operation frequencies of the main storage apparatus 12 held in the roofline model data storage unit 1110.

In Steps S306 to S309, in a case where the actual arithmetic performance of the execution block does not reach the peak performance of the arithmetic performance of the processor 11, it is determined that the current operation environment satisfies the requirement for the arithmetic performance of the processor 11 with respect to an operation frequency and the number of cores of the processor 11, and the selection is not performed.

Figure 14:
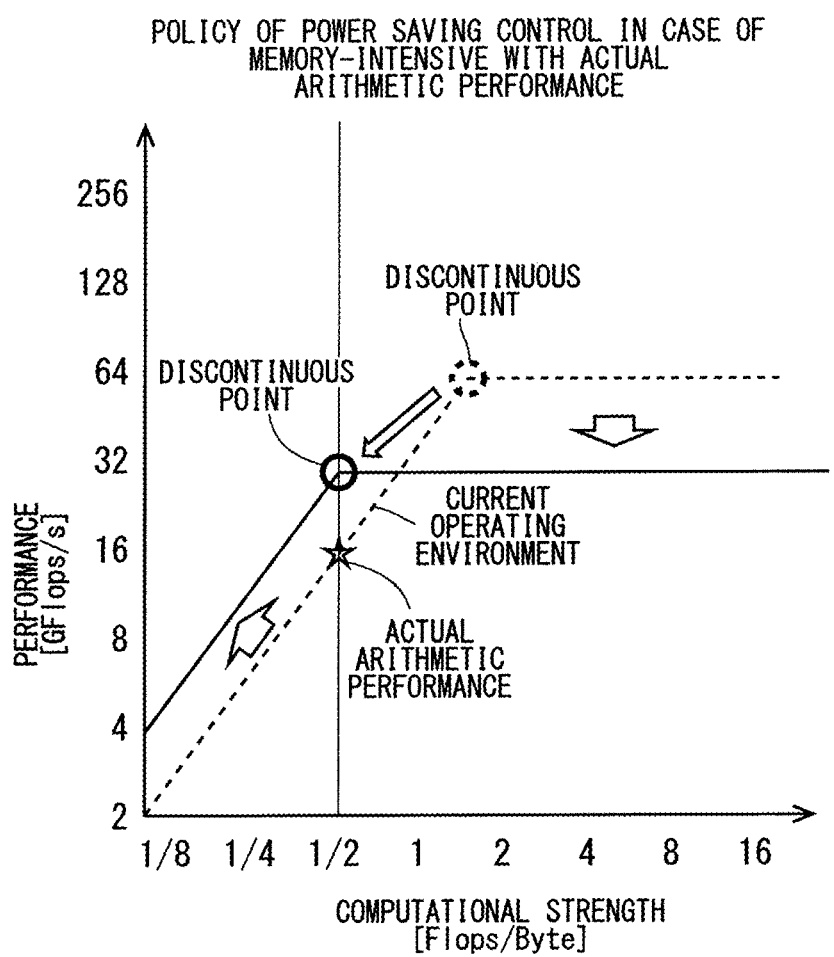
FIG. 14 is a diagram illustrating an example of a policy of power saving control in a case where an execution block is memory-intensive performed by the information processing system of a second embodiment.
Figure 15:
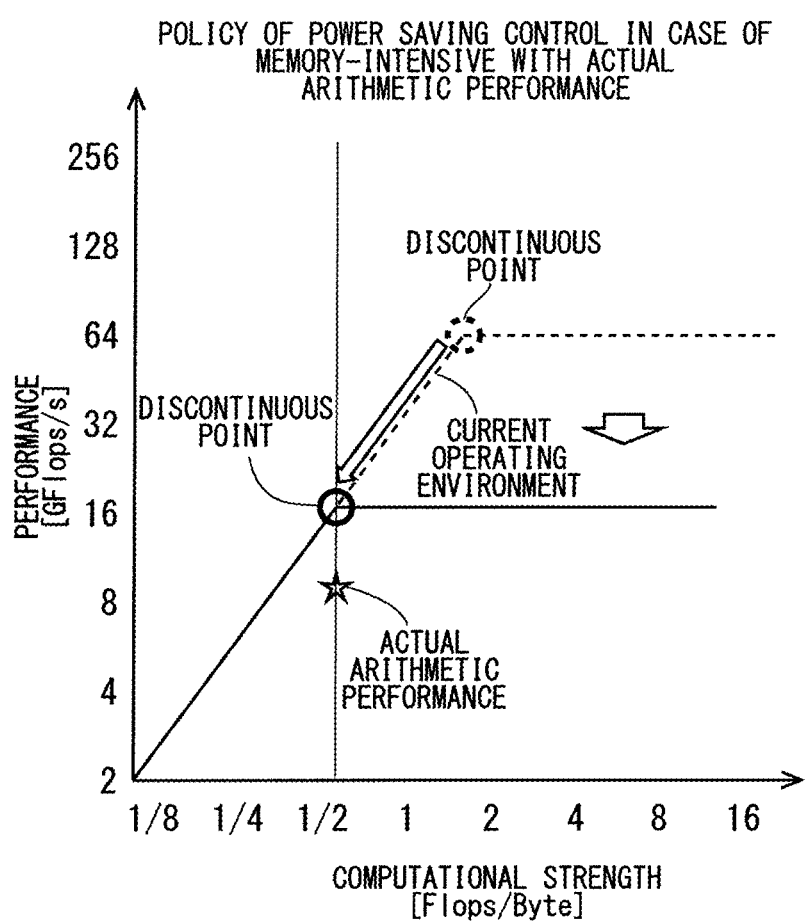
FIG. 15 is a diagram illustrating an example of a policy of power saving control in a case where an execution block is memory-intensive performed by the information processing system of the second embodiment.

FIGS. 14 and 15 are diagrams illustrating an example of a policy of power saving control in a case where an execution block is memory-intensive performed by the information processing system of the second embodiment.

In the example of a policy of power saving control illustrated in FIG. 14, the actual arithmetic performance of the execution block reaches peak performance of memory performance of the main storage apparatus 12 in a current operating environment. For this reason, the memory performance of the main storage apparatus 12, which is an obstacle to the performance when the execution block is executed, is increased to memory performance illustrated by a solid line gradient portion, and a performance requirement is satisfied. Further, the arithmetic performance of the processor 11 is lowered to arithmetic performance illustrated by a solid line flat portion so that a discontinuous point between the gradient portion and the flat portion is located on computational strength, and power saving is achieved. By these, the memory performance of the main storage apparatus 12 and the arithmetic performance of the processor 11 shift to those illustrated by solid lines.

In the example of a policy of power saving control illustrated in FIG. 15, the actual arithmetic performance of the execution block does not reach peak performance of memory performance of the main storage apparatus 12 in a current operating environment. For this reason, the memory performance of the main storage apparatus 12, which is not an obstacle to the performance when the execution block is executed, is maintained. Further, the arithmetic performance of the processor 11 is lowered to arithmetic performance of the processor 11 illustrated by a solid line flat portion so that a discontinuous point between the gradient portion and the flat portion is located on computational strength, and power saving is achieved. By these, the memory performance of the main storage apparatus 12 and the arithmetic performance of the processor 11 shift to those illustrated by solid lines.

Figure 16:
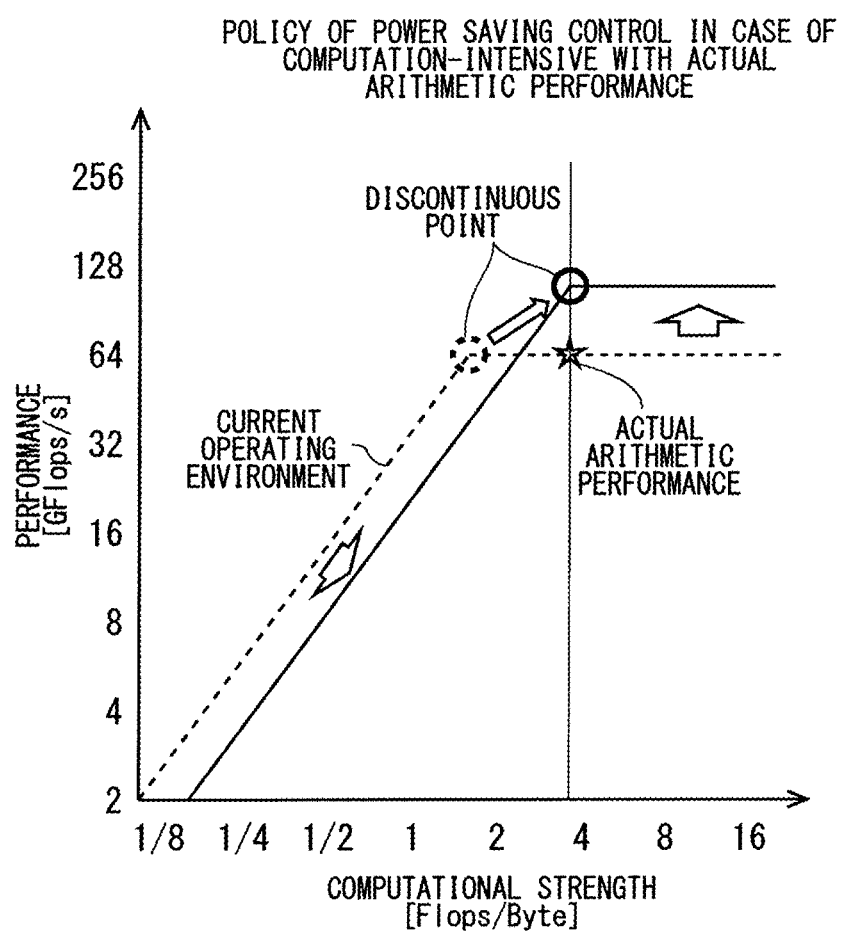
FIG. 16 is a diagram illustrating an example of a policy of power saving control in a case where an execution block is computation-intensive performed by the information processing system of the second embodiment.
Figure 17:
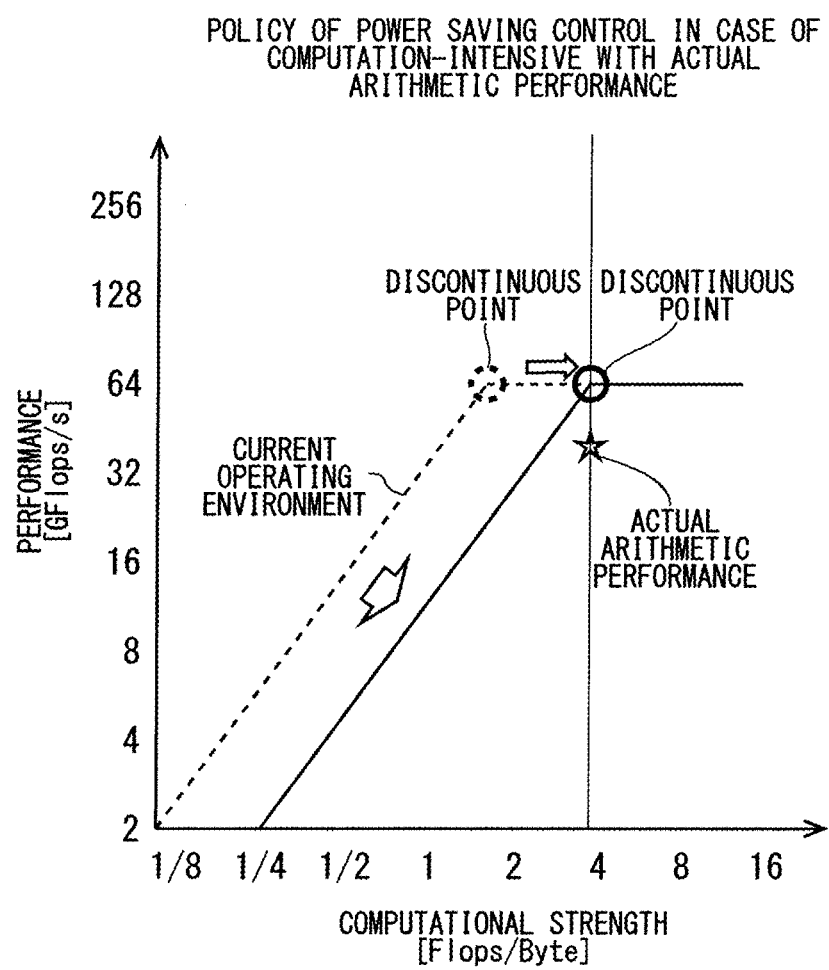
FIG. 17 is a diagram illustrating an example of a policy of power saving control in a case where an execution block is computation-intensive performed by the information processing system of the second embodiment.

FIGS. 16 and 17 are diagrams illustrating an example of a policy of power saving control in a case where an execution block is computation-intensive performed by the information processing system of the second embodiment.

In the example of a policy of power saving control illustrated in FIG. 16, the actual arithmetic performance of the execution block reaches peak performance of arithmetic performance of the processor 11 in a current operating environment. For this reason, the arithmetic performance of the processor 11, which is an obstacle to the performance when the execution block is executed, is increased to arithmetic performance of the processor 11 illustrated by a solid line flat portion, and a performance requirement is satisfied. Further, the memory performance of the main storage apparatus 12 is lowered to the memory performance of the main storage apparatus 12 illustrated by the solid line gradient portion so that a discontinuous point between the gradient portion and the flat portion is located on the computational strength, and power saving is achieved. By these, the memory performance of the main storage apparatus 12 and the arithmetic performance of the processor 11 shift to those illustrated by solid lines.

In the example of a policy of power saving control illustrated in FIG. 17, the actual arithmetic performance of the execution block does not reach peak performance of arithmetic performance of the processor 11 in a current operating environment. For this reason, the arithmetic performance of the processor 11, which is not an obstacle to the performance when the execution block is executed, is maintained. Further, the memory performance of the main storage apparatus 12 is lowered to the memory performance of the main storage apparatus 12 illustrated by the solid line gradient portion so that a discontinuous point between the gradient portion and the flat portion is located on the computational strength, and power saving is achieved. By these, the memory performance of the main storage apparatus 12 and the arithmetic performance of the processor 11 shift to those illustrated by solid lines.

Note that, embodiments can be freely combined with each other, and each embodiment can be appropriately modified or omitted.

Although the embodiments are described in detail, the above explanation is exemplary in all the aspects, and the embodiments are not limited to the explanation. It is understood that countless variations that are not exemplified are conceivable.

EXPLANATION OF REFERENCE SIGNS

10: computer system
11: processor
12: main storage apparatus
13: auxiliary storage apparatus
1000: information processing system
1100: system basic software
1200: arithmetic application
1110: roofline model data storage unit
1120: operating environment acquisition unit
1130: computational strength data acquisition unit
1140: performance power control unit
1141: performance power determination unit
1142: execution time measurement unit
1143: power control latency data unit
1144: performance power command unit
1210: program area
1220: data area
1230: execution block computational strength data area

The invention claimed is:

1. An information processing system comprising:
a processor for executing a program loaded into a main storage apparatus; and
an auxiliary storage apparatus storing a program of system basic software that, when executed by the processor, performs the following processes of:
holding computational strength data of each execution block constituting an arithmetic application that operates in an operating environment of a computer system including the processor and the main storage apparatus in an execution block computational strength data area;
holding a roofline model corresponding to a selectable operation frequency of the processor and number of cores of the processor and a selectable operation frequency of the main storage apparatus in a roofline model data storage, wherein the roofline model defines an upper limit value of performance of operation with respect to computational strength for each of selectable arithmetic performances of the processor and each of selectable memory performances of the main memory;
acquiring the computational strength data of the each execution block from the execution block computational strength data area; and
controlling the operation frequency of the processor and the number of cores of the processor and the operation frequency of the main storage apparatus based on the roofline model and the computational strength data of the each execution block.

2. The information processing system according to claim 1, wherein the processes include acquiring a current operation frequency of the processor and the number of cores of the processor, and a current operation frequency of the main storage apparatus.

3. The information processing system according to claim 1, wherein
an execution address of the each execution block, the computational strength data of the each execution block, and deadline time of the each execution block indicating time in which processing of the each execution block needs to be ended are held in the execution block computational strength data area.

4. The information processing system according to claim 3, wherein
the processes include acquiring the computational strength data of the each execution block and the deadline time of the each execution block from the execution block computational strength data area based on the execution address of the each execution block.

5. The information processing system according to claim 1, wherein
the roofline model defines an upper limit value of performance with respect to computational strength for each of combinations of selectable operation frequencies and numbers of cores of the processor and each of selectable operation frequencies of the main storage apparatus.

6. The information processing system according to claim 1, wherein the controlling includes:

determining the operation frequency of the processor and the number of cores of the processor and the operation frequency of the main storage apparatus from the roofline model and the computational strength data of the each execution block;

measuring execution time of the each execution block;

performing the controlling according to the operation frequency of the processor and the number of cores of the processor and the operation frequency of the main storage apparatus determined; and determining whether or not to perform the controlling based on an overhead time required to perform the controlling.

7. The information processing system according to claim 6, wherein the determining includes:

collating the roofline model with the computational strength data of the each execution block;

determining which of memory performance of the main storage apparatus and arithmetic performance of the processor is a rate-limiting factor in a performance aspect of the arithmetic application;

selecting an operation frequency larger than a current operation frequency of the main storage apparatus from selectable operation frequencies of the main storage apparatus held in the roofline model data storage in a case where the memory performance is determined to be the rate-limiting factor; and selecting an operation frequency and/or number of cores larger than a current operation frequency and/or number of cores from selectable operation frequencies and/or numbers of cores of the processor held in the roofline model data storage in a case where the arithmetic performance is determined to be the rate-limiting factor.

8. The information processing system according to claim 6, wherein whether or not to perform the controlling is determined based on the measured execution time of the each execution block and the overhead time required to perform each predefined control.

9. The information processing system according to claim 6, wherein the operation frequency of the processor and the number of cores of the processor and the operation frequency of the main storage apparatus are set as the determined operation frequency and the number of cores of the processor and the operation frequency of the main storage apparatus in a case where performing the controlling is determined.

10. An information processing system control method comprising the steps of:

a) holding computational strength data of each execution block constituting an arithmetic application that operates in an operating environment of a computer system including a processor including a power saving mechanism and a main storage apparatus;

b) acquiring the computational strength data of the each execution block;

c) storing a roofline model corresponding to a selectable operation frequency of the processor and number of cores of the processor and a selectable operation frequency of the main storage apparatus, wherein the roofline model defines an upper limit value of performance of operation with respect to computational strength for each of selectable arithmetic performances of the processor and each of selectable memory performances of the main memory; and d) performing control of the operation frequency of the processor and number of cores of the processor and an operation frequency of the main storage apparatus based on the roofline model and the computational strength data of the each execution block.

11. The information processing system according to claim 1, wherein:

the roofline model defines an upper limit value of performance of floating point operation with respect to computational strength for each of the selectable arithmetic performances of the processor and each of the selectable memory performances of the main memory.

12. The information processing system according to claim 1, wherein:

the computational strength data indicates the number of operations per byte of each execution block.

13. The information processing system control method of claim 10, wherein:

the roofline model defines an upper limit value of performance of floating point operation with respect to computational strength for each of the selectable arithmetic performances of the processor and each of the selectable memory performances of the main memory.

14. The information processing system control method of claim 10, wherein:

the computational strength data indicates the number of operations per byte of each execution block.

* * * * *